(12) United States Patent
VanArsdale, Jr.

(10) Patent No.: US 8,172,031 B2
(45) Date of Patent: May 8, 2012

(54) PINCH BOLT MOUNTING OF A SHIFTER ASSEMBLY

(75) Inventor: Robert G. VanArsdale, Jr., Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 715 days.

(21) Appl. No.: 12/274,382

(22) Filed: Nov. 20, 2008

(65) Prior Publication Data
US 2010/0122601 A1 May 20, 2010

(51) Int. Cl.
*B60K 20/04* (2006.01)
(52) U.S. Cl. ............... 180/336; 74/473.3; 74/473.36
(58) Field of Classification Search .......... 180/315, 180/336; 74/473.1, 473.2, 473.3, 473.34, 74/473.36, 473.37, 73.2; 403/3, 4, 191, 235, 403/234, 350, 351, 352, 353
See application file for complete search history.

(56) References Cited

U.S. PATENT DOCUMENTS

| | | | | |
|---|---|---|---|---|
| 3,323,387 | A * | 6/1967 | Hurst, Jr. et al. | 74/473.3 |
| 3,323,609 | A * | 6/1967 | Rosenberger et al. | 180/336 |
| 3,566,711 | A * | 3/1971 | Leuenberger | 74/483 R |
| 4,606,238 | A * | 8/1986 | Ikemoto et al. | 74/473.29 |
| 5,749,268 | A * | 5/1998 | Nishimura | 74/473.3 |
| 6,282,975 | B1 * | 9/2001 | Harrison et al. | 74/473.3 |
| 6,510,915 | B1 * | 1/2003 | Meyer | 180/336 |
| 2008/0001422 | A1 * | 1/2008 | Kwolek | 296/24.34 |

* cited by examiner

*Primary Examiner* — Joseph Rocca
(74) *Attorney, Agent, or Firm* — Quinn Law Group, PLLC

(57) ABSTRACT

A vehicle has a shifter assembly for shifting a transmission, and a floor pan. The shifter assembly includes a base and an attachment assembly for adjustably attaching the shifter assembly to the floor pan. The attachment assembly includes a bushing that is adjustable in a horizontal direction relative to the floor pan or a vertical direction relative to the base.

15 Claims, 4 Drawing Sheets

US 8,172,031 B2

PINCH BOLT MOUNTING OF A SHIFTER ASSEMBLY

TECHNICAL FIELD

The present invention relates, generally, to a shifter assembly for an automotive vehicle, and more specifically, to an arrangement for mounting the shifter assembly.

BACKGROUND OF THE INVENTION

Shifter assemblies in automotive vehicles with automatic transmissions allow the vehicle operator to select a mode of operation for the transmission from within a passenger compartment for the vehicle. Typically, the shifter assembly includes a base which is mounted to the floor pan of the vehicle.

The manufacturing assembly of vehicles may create build variations under some circumstances. As a result of such build variations, the shifter assembly may not align perfectly with reference to other vehicle components, particularly those within the passenger compartment that may be proximate to the shifter assembly, but not attached to the shifter assembly. However, reducing the build variations to maintain perfect alignment between these components results in high costs.

SUMMARY OF THE INVENTION

An arrangement for mounting a shifter assembly for a vehicle that can align the shifter assembly with other vehicle components and accommodate build variations is desired. A vehicle has a shifter assembly for shifting a transmission, and a floor pan for the vehicle. The shifter assembly includes a base and an attachment assembly for adjusting and attaching the shifter assembly to the floor pan. The attachment assembly includes a bushing that is adjustable in a horizontal direction relative to the floor pan or a vertical direction relative to the base. A bushing bolt prevents movement of the bushing relative to the floor pan when fully engaged. Further, when a pinch bolt is fully engaged, the pinch bolt causes at least a portion of the bushing to compress to prevent movement of the bushing relative to the base.

The attachment assembly may include a clamp assembly. The clamp assembly would include the pinch bolt to compress the bushing and prevent movement of the bushing relative to the base when the pinch bolt is fully engaged.

A method of mounting the shifter assembly to the floor pan includes placing the bushing within a base opening defined by a base of the shifter assembly. The method then includes adjusting the bushing in one of the horizontal direction relative to the floor pan and the vertical direction relative to the shifter assembly base. Once the shifter assembly is in the desired position, a pinch bolt is threaded within an opening to compress at least a portion of the bushing. A bushing bolt is threaded within another opening to secure the bushing to the floor pan.

The above features and advantages, and other features and advantages of the present invention will be readily apparent from the following detailed description of the preferred embodiments and best modes for carrying out the present invention when taken in connection with the accompanying drawings.

DESCRIPTION OF THE PREFERRED EMBODIMENTS

Figure 1:
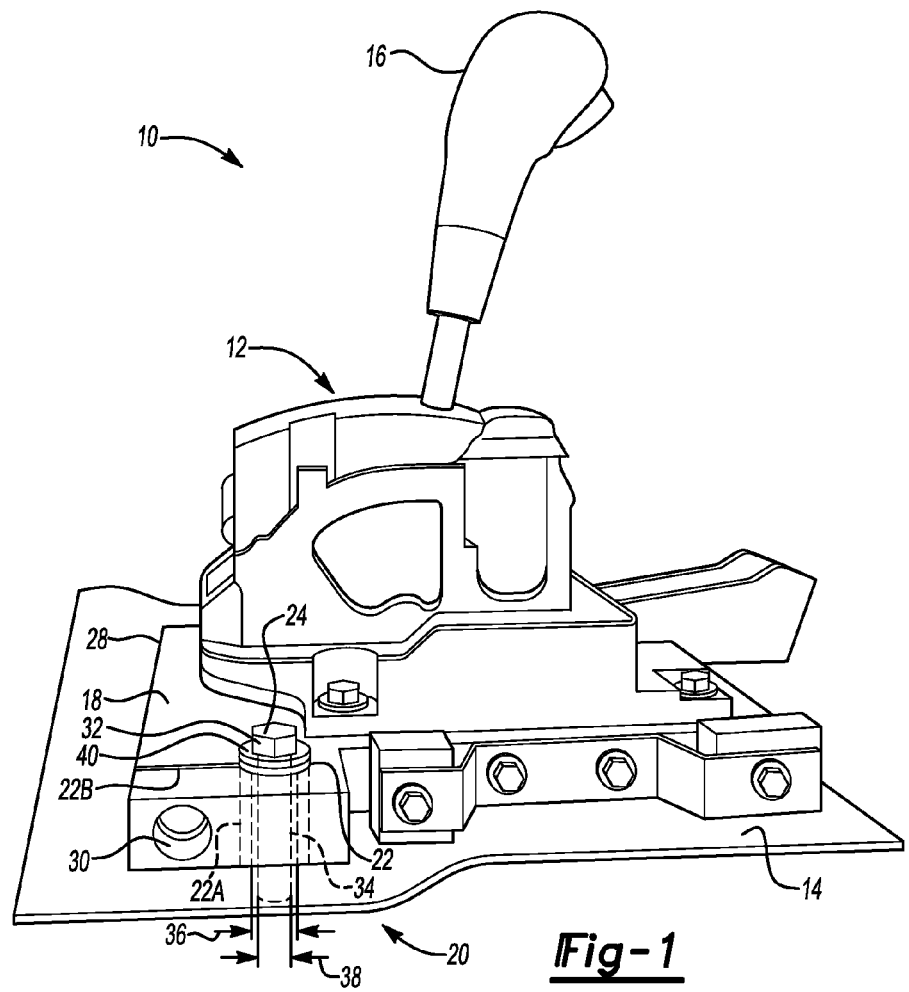
FIG. 1 is a schematic perspective view of a shifter assembly for an automotive vehicle.

Referring to the Figures, wherein like reference numbers refer to the same or similar components throughout the several views, FIG. 1 schematically illustrates a vehicle 10 having a shifter assembly 12 mounted on a floor pan 14. The shifter assembly 12 includes at least a handle 16 and a base 18. The shifter assembly 12 is mounted to the floor pan 14 with an attachment assembly 20. The attachment assembly 20 has a bushing 22, a bushing bolt 24 and a pinch bolt 27 (shown in FIG. 3). The attachment assembly 20 is illustrated on one corner of the base 18, the other corners may each have the attachment assembly 20 for securing the base 18 to the floor pan 14, as well. Alternatively, the attachment assembly 20 may be located on two of the corners, such as the two closest to the engine compartment (not shown) of the vehicle 10, and a traditional bolt may be utilized for the remaining two corners.

The bushing 22 is inserted within a base opening 26 defined by the base 18. The base opening 26 extends through the base 18. The base opening 26 includes an opening circular portion 26A and an opening flange portion 26B. The opening flange portion 26B extends from the opening circular portion 26B to an end 28 of the base 18. Likewise, the bushing 22 that is inserted within the base opening 26 includes a bushing circular portion 22A and a bushing flange portion 22B. The bushing circular portion 22A is inserted within the opening circular portion 26A. The bushing circular portion 22A may have an interference fit with the opening circular portion 26A, but it is not necessary. The bushing flange portion 22B fits within the opening flange portion 26B and extends towards the end 28 of the base 18.

The pinch bolt 27 (shown in FIG. 4) may be inserted within a pinch opening 30. The pinch bolt 27 extends through the bushing flange portion 22B and threads into the base 18. Prior to assembly the pinch bolt 27 may be partially threaded in the base 18 to assist in retaining the bushing 22 within the base opening 26.

The bushing bolt 24 fits within the bushing circular portion 22A and is threaded into the floor pan 14. The bushing bolt 24 includes a bolt head 32 and a threaded portion 34. The bushing circular portion 22A is annular in shape and defines a bushing opening 35 having a bushing inner diameter 36. The bushing inner diameter 36 is larger than a bolt diameter 38 of the threaded portion 34 of the bushing bolt 24. A washer 40 may be located between the bolt head 32 and the bushing 22 to prevent the bushing bolt 24 from falling into the bushing opening 35 during assembly of the shifter assembly 12 on the vehicle 10.

Figure 2:
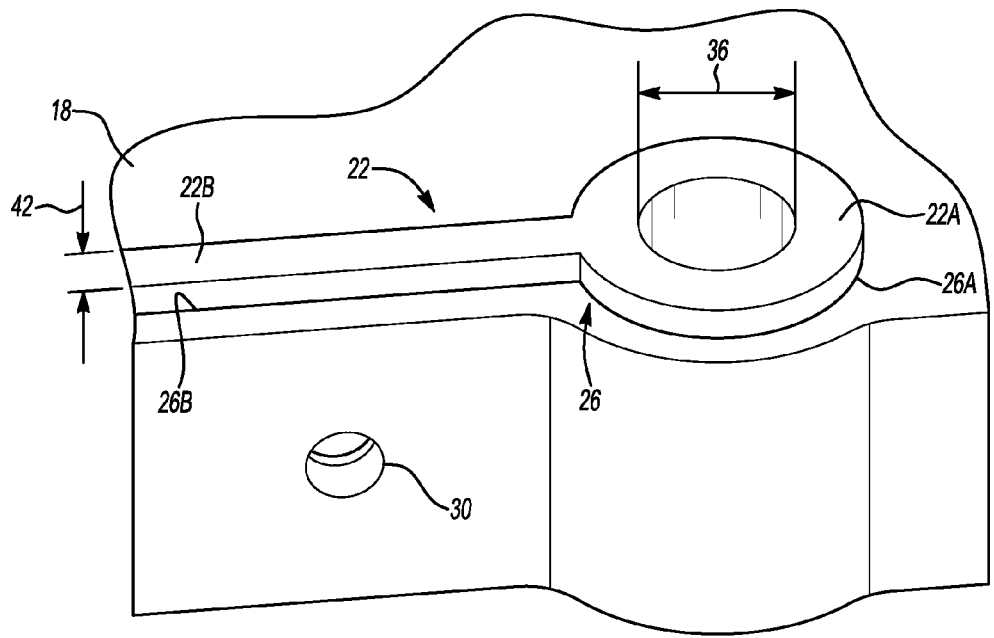
FIG. 2 is a perspective fragmentary view of a first embodiment of a mounting arrangement for the shifter assembly of FIG. 1 where the bolts have been removed.
Figure 3:
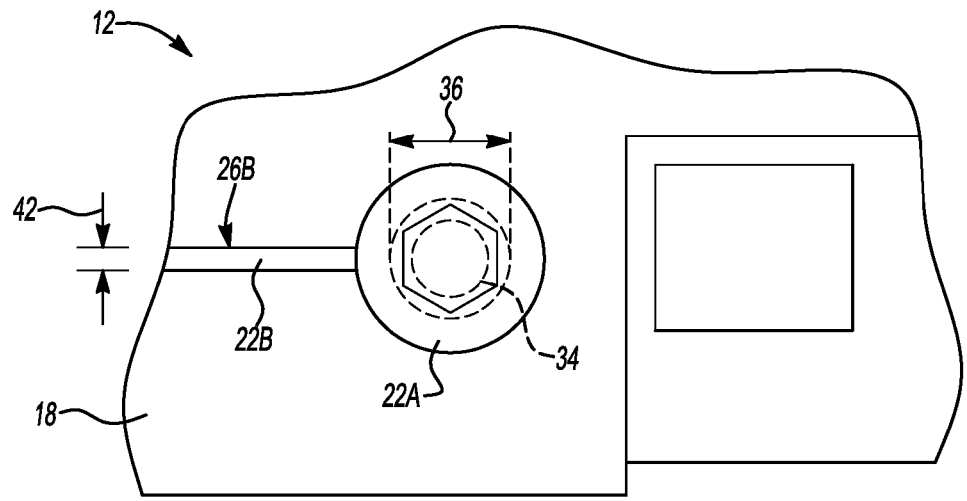
FIG. 3 is a top view of the first embodiment of the mounting arrangement for the shifter assembly of FIGS. 1 and 2.

Referring to FIGS. 2 and 3, one corner of the shifter assembly base 18 is illustrated. The bushing 22 is located within the bolt opening 26 in the base 18. In FIG. 3 the pinch bolt 27 is partially threaded in the base 18. The bushing bolt 24 is partially threaded into the floor pan 14 (shown in FIG. 1). As described above, the bushing 22 has a larger bushing inner diameter 36 than the bolt diameter 38 of the bushing bolt 24. When the bushing bolt 24 and the pinch bolt 27 are partially threaded, the bushing 22 can move relative to the bushing bolt 24 due to the difference in size between the bolt diameter 38 and the bushing inner diameter 36. In other words, the space between the bushing 22 and the bushing bolt 24 allows the shifter assembly 12 to move relative to the bushing bolt 24 and thus, the floor pan 14. When the shifter assembly 12 is in the desired position the bushing bolt 24 and the pinch bolt 27 are tightened. The base 18 squeezes the bushing 22 around the bushing circular portion 22A and the bushing flange portion 22B due to the pressure on the base 18 applied by the pinch bolt 27. The bushing inner diameter 36 is reduced as is a width 42 of the bushing flange portion 22B.

Fully engaging the pinch bolt 27 with the base 18 prevents movement of the shifter assembly 12 in any horizontal direction. Fully engaging the bushing bolt 24 with the floor pan 14 prevents movement of the shifter assembly 12 in the vertical direction. The bushing bolt 24 is only partially threaded when adjusting the position of the shift assembly 12 to assist in moving the shifter assembly 12 without having to overcome the apply force of the bushing bolt 24 on the base 18.

Figure 4:
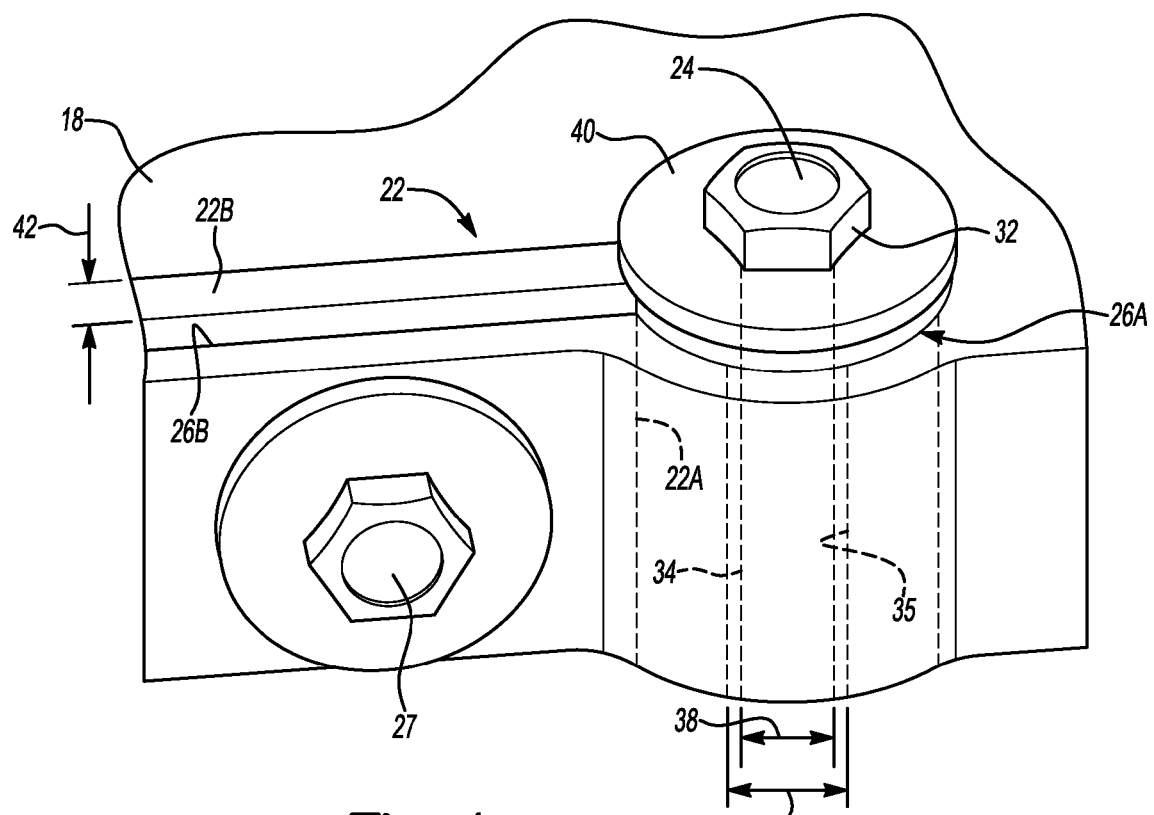
FIG. 4 is a perspective fragmentary view of the first embodiment of the mounting arrangement for the shifter assembly of FIGS. 1-3.

FIG. 3 shows the shifter assembly 12 when the pinch bolt 27 (shown in FIG. 4) is threaded and tightened to retain the shifter assembly 12 to the floor pan 14 (shown in FIG. 1) in the horizontal direction. After the pinch bolt 27 is tightened, as shown in FIG. 4, the base 18 applies pressure to the bushing 22. The inner diameter 38 of the bushing 22 is decreased due to the pressure by the base 18. The bushing inner diameter 36 is now the same size as the bolt diameter 38 and the shifter assembly 12 is prevented from moving relative to the floor pan 14. Additionally, the width of the bushing flange portion 22B is reduced when compared with FIG. 2 when the pinch bolt 27 is not fully engaged. The desired position of the shifter assembly 12 may thus be located relative to another component within the vehicle 10, for example an instrument panel (not shown).

Figure 5A:
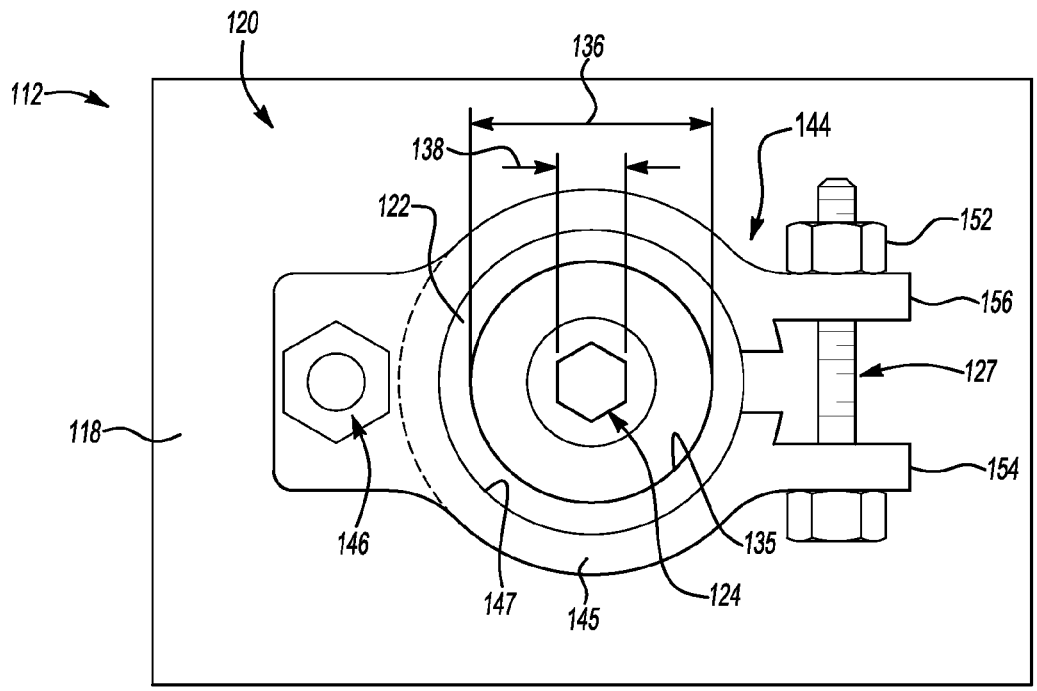
FIG. 5A is a top view of a second embodiment of a mounting arrangement for the shifter assembly of FIG. 1.
Figure 5B:
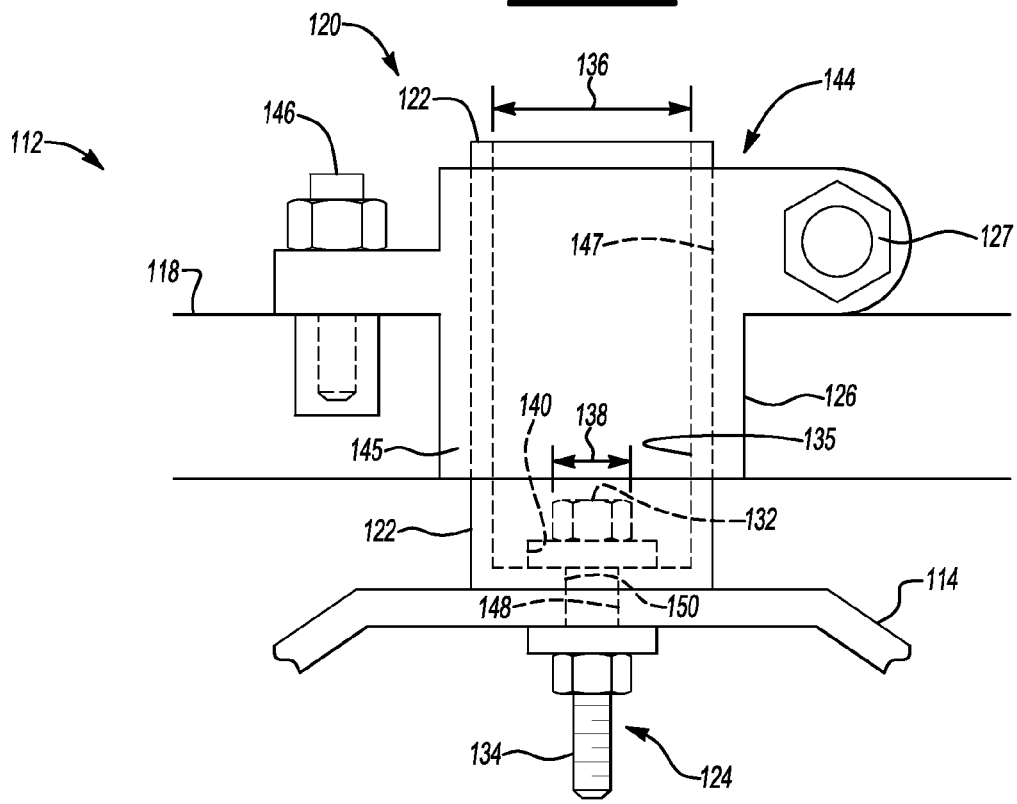
FIG. 5B is a side view of the second embodiment of a mounting arrangement for the shifter assembly of FIG. 5A.

FIGS. 5A and 5B illustrate another embodiment of a shifter assembly 112 having a base 118. The shifter assembly 112 is mounted to the floor pan 114 with an attachment assembly 120. The attachment assembly 120 is illustrated on one corner of the base 118, the other corners may each have the attachment assembly 120 for securing the base 118 to the floor pan 114, as well. The attachment assembly 120 has a bushing 122, a bushing bolt 124 and a clamp assembly 144. The clamp assembly 144 includes a pinch bolt 127 and a clamp bolt 146. The base 118 defines a base opening 126. The clamp assembly 144 is inserted into the base opening 126. The clamp bolt 146 is threaded into the base 118 and retains the clamp assembly 144 within the base opening 126 and secures the clamp assembly 144 to the base 118.

The clamp assembly 144 has a generally annular portion 145 defining a clamp opening 147. Similar to the base opening 126, the clamp opening 147 extends through the clamp assembly 144. The bushing 122 is inserted within the clamp opening 147 and extends through the base 118 and the clamp assembly 144 to the floor pan 114.

The bushing 122 is secured to the floor pan 114 with a bushing bolt 124. The bushing bolt 124 includes a bolt head 132 and threaded portion 134. The bushing 122 is annular in shape and defines a bushing opening 135 having a bushing inner diameter 136. The bushing inner diameter 136 is larger than a bolt diameter 138 to allow the bushing bolt 124 to fit within the bushing opening 135. The bushing opening 135 may also be large enough to accommodate a washer 140, to prevent the bushing bolt 124 from falling through an opening 148 in the floor pan 114 and an opening 150 in the bushing 122.

After the bushing bolt 124 is secured to the floor pan 114 and the clamp bolt 146 is secured to the base 118, the shifter assembly 112 may still be adjusted in the vertical direction. Movement of the clamp assembly 144 and therefore, base 118 as well, relative to the bushing 122 would allow vertical adjustment of the shifter assembly 112 to the desired position. Once the shifter assembly 112 is in the desired position, the clamp assembly 144 is tightened around the bushing 122 to prevent further vertical movement of the shifter assembly 112.

The pinch bolt 127 may be inserted within the clamp assembly 144. A nut 152 secures the pinch bolt 127 to the clamp assembly 144. The nut 152 is threaded onto the pinch bolt 127. Threading nut 152 further on the pinch bolt 127 applies pressure to legs 154 and 156 of the clamp assembly 144 through which the pinch bolt 127 extends. The pressure on legs 154 and 156 moves the legs 154 and 156 towards one another to tighten the clamp assembly 144 around the bushing 122. Once the clamp assembly 144 is tightened around the bushing 122, the bushing 122 can no longer move relative to the clamp assembly 144. Thus, the base 118 can no longer move vertically with respect to the bushing 122 and the shifter assembly 112 is, thus, secured to the floor pan 114. The desired position of the shifter assembly 112 may thus be located to another component within the vehicle 10, for example an instrument panel (not shown).

Figure 6A:
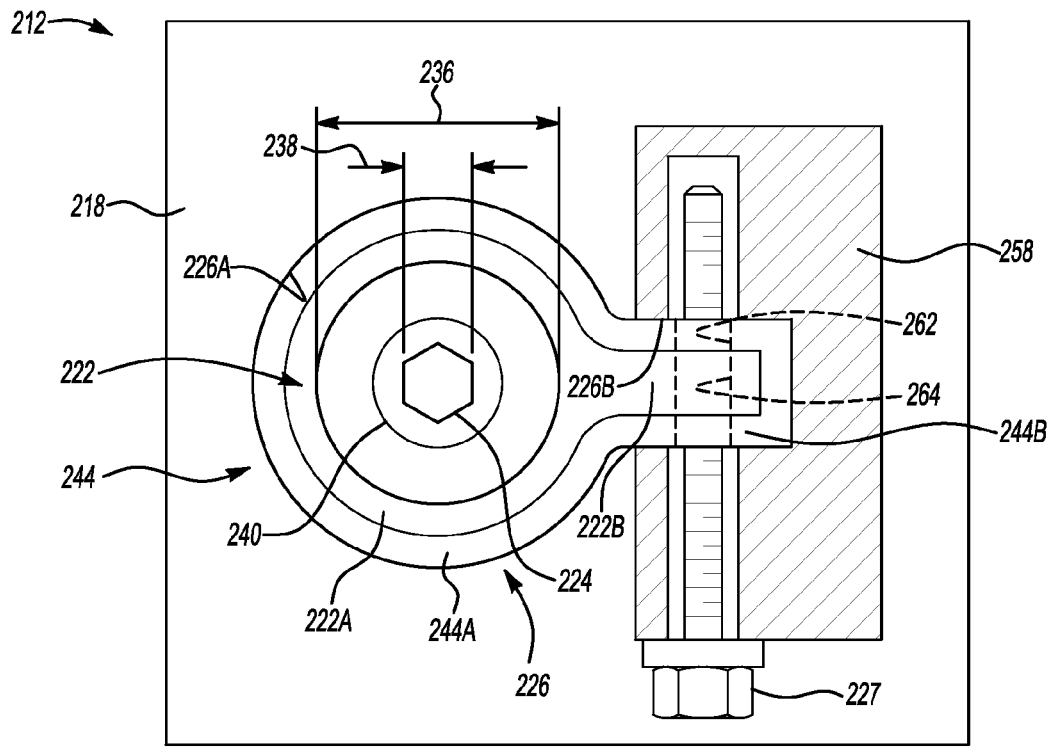
FIG. 6A is a top view of a third embodiment of a mounting arrangement for the shifter assembly of FIG. 1.
Figure 6B:
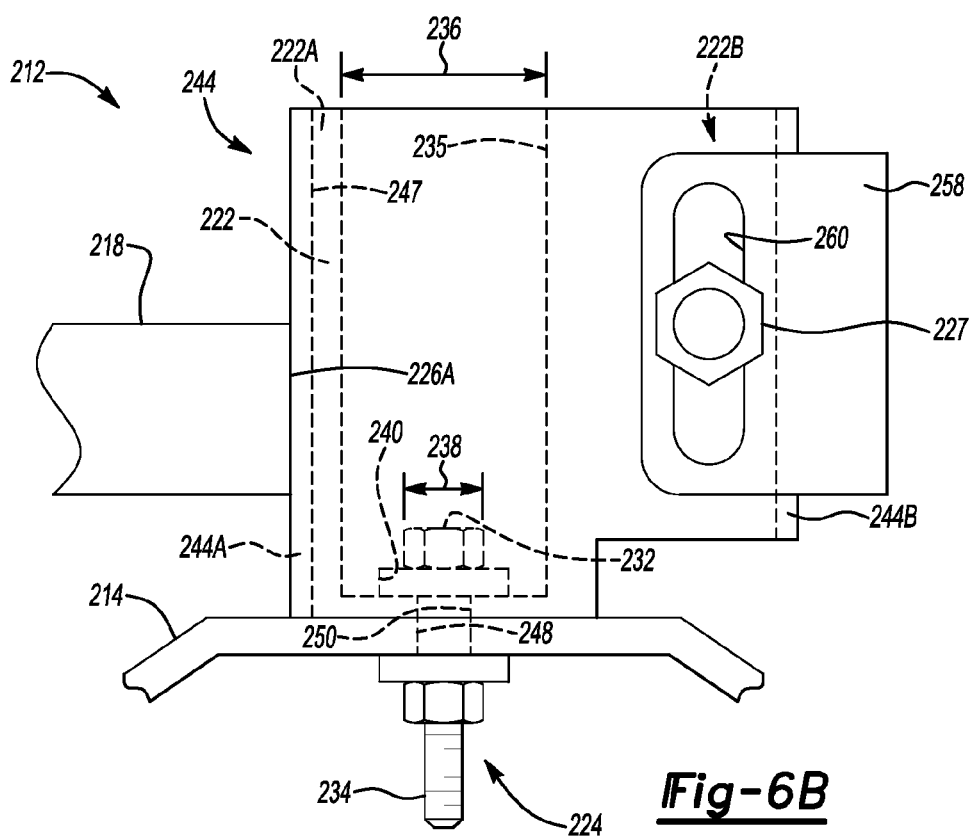
FIG. 6B is a side view of the third embodiment of a mounting arrangement for the shifter assembly of FIG. 6A.

FIGS. 6A and 6B illustrate another embodiment of a shifter assembly 212 having a base 218. The shifter assembly 212 is mounted to the floor pan 214 with an attachment assembly 220. The attachment assembly 220 is illustrated on one corner of the base 218, the other corners may each have the attachment assembly 220 for securing the base 218 to the floor pan 214, as well.

The attachment assembly 220 has a bushing 222, a bushing bolt 224, a clamp assembly 244 and a reinforcing portion 258 defined by the base 218. The clamp assembly 244 includes a pinch bolt 227. The reinforcing portion 258 defines a keyhole slot 260 for receiving the pinch bolt 227 to secure the clamp assembly 244 to the base 218.

The base 218 defines a base opening 226. The base opening 226 extends through the base 218. The base opening 226 includes an opening circular portion 226A and an opening flange portion 226B. The opening flange portion 226B extends from the opening circular portion 226B to the reinforcing portion 258 of the base 18.

The clamp assembly 244 is inserted into the base opening 226. The clamp assembly 244 has a clamp circular portion 244A defining a clamp opening 247. Similar to the base opening 226, the clamp opening 247 extends through the clamp circular portion 244A of the clamp assembly 244. The bushing 222 is inserted within the clamp opening 247 and extends through the base 218 and the clamp assembly 244 to the floor pan 214. Likewise, the bushing 222 that is inserted within the clamp opening 247 includes a bushing circular portion 222A and a bushing flange portion 222B. The bushing circular portion 222A is inserted within the clamp circular portion 244A. The bushing flange portion 222B fits within the clamp flange portion 244B and extends towards the reinforcing portion 258 of the base 218.

The bushing 222 is secured to the floor pan 214 with a bushing bolt 224. The bushing bolt 224 includes a bolt head 232 and threaded portion 234. The bushing 222 is annular in shape and defines a bushing opening 235 having a bushing inner diameter 236. The bushing inner diameter 236 is larger than a bolt diameter 238 to allow the bushing bolt 224 to fit within the bushing opening 235. The annular opening 235 may also be large enough to accommodate a washer 240, to prevent the bushing bolt 224 from falling through an opening 248 in the floor pan 214 and an opening 250 in the bushing 222.

After the bushing bolt 224 is secured to the floor pan 214 the shifter assembly 212 may still be adjusted in the vertical direction. Movement of the clamp assembly 244 and the bushing 222 relative to the base 218 would allow vertical adjustment of the shifter assembly 212 to the desired position. The keyhole slot 260 provides the pinch bolt 227 with a range of alignment positions relative to the base 218. Once the shifter assembly 212 is in the desired position the pinch bolt 227 is threaded into the reinforcing portion 258 of the base 118 and is tightened. The clamp assembly 244 includes a clamp aperture 262 and the bushing includes a bushing aperture 264. The pinch bolt 227 extends through both apertures to retain the bushing 222 and the clamp assembly 244 relative to the base 118.

After the clamp assembly 244 is tightened around the bushing 222 the bushing 222 and the clamp assembly 244 can no longer move relative to the base 218. Thus, the shifter assembly 212 is secured to the floor pan 214. The desired position of the shifter assembly 212 may thus be located to another component within the vehicle 10, for example an instrument panel (not shown).

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
    a shifter assembly for shifting a transmission, wherein the shifter assembly includes a base;
    a floor pan;
    an attachment assembly for adjustably attaching the shifter assembly to the floor pan, wherein the attachment assembly includes:
        a bushing that is adjustable in one of a substantially horizontal direction relative to the floor pan and a substantially vertical direction relative to the base;
        a bushing bolt to prevent movement of the bushing relative to the floor pan;
        a pinch bolt to cause at least a portion of the bushing to compress to prevent movement of the bushing relative to the base, when the pinch bolt is fully engaged;
        a clamp assembly;
        wherein the clamp assembly is received within an opening defined by the base;
        wherein the clamp assembly has a generally annular portion defining a clamp opening;
        wherein the bushing is received within the clamp opening; and
        wherein the pinch bolt engages the clamp assembly to tighten the clamp assembly around the bushing to prevent movement of the bushing relative to the base.

2. The vehicle of claim 1, wherein the clamp assembly is secured to the base with a clamp bolt.

3. The vehicle of claim 1, wherein the clamp assembly is secured to the base with the pinch bolt.

4. The vehicle of claim 1, wherein the bushing comprises a flange portion extending from the generally annular portion, and wherein the pinch bolt compresses the flange portion of the bushing.

5. The vehicle of claim 1, wherein the bushing is received within a base opening defined by the base, and wherein the pinch bolt engages the base to tighten the base around the bushing to prevent movement of the bushing relative to the base.

6. The vehicle of claim 5, wherein the bushing comprises a flange portion and the pinch bolt compresses the flange portion of the bushing.

7. The vehicle of claim 1, wherein the bushing has a generally annularly shaped portion having an inner diameter, and wherein the inner diameter is larger than a diameter of the bushing bolt.

8. A vehicle comprising:
    a shifter assembly for shifting a transmission, wherein the shifter assembly includes a base;
    a floor pan;
    a bushing that is secured to the floor pan and adjustable in a substantially vertical direction relative to the base;
    a clamp assembly, wherein the clamp assembly includes a pinch bolt to cause at least a portion of the bushing to compress to prevent movement of the bushing relative to the base, when the pinch bolt is fully engaged; and
    wherein the pinch bolt extends in a substantially horizontal direction.

9. The vehicle of claim 8, wherein the clamp assembly is received within an opening defined by the base;
    wherein the clamp assembly has a generally annular portion defining a clamp opening;
    wherein the bushing is received within the clamp opening; and wherein the pinch bolt engages the clamp assembly to tighten the clamp assembly around the bushing to prevent movement of the bushing relative to the base.

10. The vehicle of claim 8, wherein the clamp assembly is secured to the base with the pinch bolt.

11. The vehicle of claim 10, wherein the bushing comprises a flange portion extending from the generally annular portion, and wherein the pinch bolt compresses the flange portion of the bushing.

12. The vehicle of claim 8, wherein the clamp assembly is secured to the base with a clamp bolt.

13. A method of mounting a shifter assembly for a transmission to a floor pan for a vehicle comprising:
    placing a bushing within a base opening defined by a base of the shifter assembly;
    adjusting the bushing in one of a substantially horizontal direction relative to the floor pan and a substantially vertical direction relative to the base;
    threading a pinch bolt within a pinch opening, to compress at least a portion of the bushing;
    threading a bushing bolt within the base opening to secure the bushing to the floor pan;
    placing a clamp assembly within the base opening;
    placing the bushing within a clamp opening defined by the clamp assembly; and
    wherein threading the pinch bolt includes tightening the clamp assembly around the bushing to prevent movement of the bushing relative to the base.

14. The method of claim 13, wherein said threading the pinch bolt further comprises, compressing a flange portion of the bushing.

15. The method of claim 13, wherein the threading the bushing bolt further comprises locating at least a portion of the bushing bolt within a bushing opening defined by the bushing.

* * * * *